XR 3,636,552

Orima

[15] 3,636,552

[45] Jan. 18, 1972

[54] OPTICAL PATH SELECTION SYSTEM

[72] Inventor: Isamu Orima, Sagamihara-shi, Japan

[73] Assignee: Kabushiki Kaisha Ricoh, Tokyo, Japan

[22] Filed: Aug. 22, 1969

[21] Appl. No.: 852,342

[30] Foreign Application Priority Data

Aug. 31, 1968 Japan ....................43/62536

[52] U.S. Cl. ....................340/324 R, 340/325, 340/378, 340/379

[51] Int. Cl. ....................G08b 5/32

[58] Field of Search ....................340/324, 325, 378, 379, 336, 340/339, 324 R

[56] References Cited

UNITED STATES PATENTS

| | | | |
|---|---|---|---|
| 3,042,912 | 7/1962 | Gilbert | 340/324 X |
| 3,054,203 | 9/1962 | French | 340/324 X |
| 3,103,007 | 9/1963 | Gumpertz | 340/324 X |
| 3,110,893 | 11/1963 | Peacock | 340/324 X |
| 3,146,367 | 8/1964 | McNaney | 340/378 X |
| 3,244,071 | 4/1966 | Gumpertz | 340/378 X |

*Primary Examiner*—John W. Caldwell
*Assistant Examiner*—David L. Trafton
*Attorney*—Burgess, Ryan and Hicks

[57] ABSTRACT

An optical path selection system for use in information display or retrieval system wherein backwardly of a character plate having a suitable number of characters arrayed in rows and columns are disposed a plurality of character selection plates each having a plurality of transparent and opaque frames which are arrayed in accordance with the binary codes representing such characters. The number of such character selection plates is the same as that of the bits constituting said codes; and said character selection plates are selectively displaced in either of the row or column direction by a distance corresponding to the width of each frame in response to an instruction given in the form of the codes, thereby opening the optical path only for a selected character in response to the instruction.

7 Claims, 12 Drawing Figures

FIG. 7

| PLATE | K2 | K1 |
|---|---|---|
| WEIGHT | 2 | 1 |
| A | 0 | 0 |
| B | 0 | 1 |
| C | 1 | 0 |
| D | 1 | 1 |

FIG. 8

| PLATE | L4 | L3 | L2 | L1 |
|---|---|---|---|---|
| WEIGHT | 8 | 4 | 2 | 1 |
| A | 0 | 0 | 0 | 0 |
| B | 0 | 0 | 0 | 1 |
| C | 0 | 0 | 1 | 0 |
| D | 0 | 0 | 1 | 1 |
| E | 0 | 1 | 0 | 0 |
| F | 0 | 1 | 0 | 1 |
| G | 0 | 1 | 1 | 0 |
| H | 0 | 1 | 1 | 1 |
| I | 1 | 0 | 0 | 0 |
| J | 1 | 0 | 0 | 1 |
| K | 1 | 0 | 1 | 0 |
| L | 1 | 0 | 1 | 1 |
| M | 1 | 1 | 0 | 0 |
| N | 1 | 1 | 0 | 1 |
| O | 1 | 1 | 1 | 0 |
| P | 1 | 1 | 1 | 1 |

FIG. 9

| PLATE | M10 | M9 | M8 | M7 | M6 | M5 | M4 | M3 | M2 | M1 |
|---|---|---|---|---|---|---|---|---|---|---|
| WEIGHT | 512 | 256 | 128 | 62 | 32 | 16 | 8 | 4 | 2 | 1 |
| 0 | 0 | 0 | 0 | 0 | 0 | 0 | 0 | 0 | 0 | 0 |
| 1 | 0 | 0 | 0 | 0 | 0 | 0 | 0 | 0 | 0 | 0 |
| 2 | 0 | 0 | 0 | 0 | 0 | 0 | 0 | 0 | 1 | 0 |
| 3 | 0 | 0 | 0 | 0 | 0 | 0 | 0 | 0 | 1 | 1 |
| 4 | 0 | 0 | 0 | 0 | 0 | 0 | 0 | 1 | 0 | 0 |
| 5 | 0 | 0 | 0 | 0 | 0 | 0 | 0 | 1 | 0 | 1 |
| 6 | 0 | 0 | 0 | 0 | 0 | 0 | 0 | 1 | 1 | 0 |
| 7 | 0 | 0 | 0 | 0 | 0 | 0 | 0 | 1 | 1 | 1 |
| 8 | 0 | 0 | 0 | 0 | 0 | 0 | 1 | 0 | 0 | 0 |
| 9 | 0 | 0 | 0 | 0 | 0 | 0 | 1 | 0 | 0 | 1 |
| 10 | 0 | 0 | 0 | 0 | 0 | 0 | 1 | 0 | 1 | 0 |
| 11 | 0 | 0 | 0 | 0 | 0 | 0 | 1 | 0 | 1 | 1 |
| 12 | 0 | 0 | 0 | 0 | 0 | 0 | 1 | 1 | 0 | 0 |
| 13 | 0 | 0 | 0 | 0 | 0 | 0 | 1 | 1 | 0 | 1 |
| 14 | 0 | 0 | 0 | 0 | 0 | 0 | 1 | 1 | 1 | 0 |
| 15 | 0 | 0 | 0 | 0 | 0 | 0 | 1 | 1 | 1 | 1 |
| 16 | 0 | 0 | 0 | 0 | 0 | 1 | 0 | 0 | 0 | 0 |
| 17 | 0 | 0 | 0 | 0 | 0 | 1 | 0 | 0 | 0 | 1 |
| 18 | 0 | 0 | 0 | 0 | 0 | 1 | 0 | 0 | 1 | 0 |
| 19 | 0 | 0 | 0 | 0 | 0 | 1 | 0 | 0 | 1 | 1 |
| 20 | 0 | 0 | 0 | 0 | 0 | 1 | 0 | 1 | 0 | 0 |
| 21 | 0 | 0 | 0 | 0 | 0 | 1 | 0 | 1 | 0 | 1 |
| 1010 | 1 | 1 | 1 | 1 | 1 | 1 | 0 | 0 | 1 | 0 |
| 1011 | 1 | 1 | 1 | 1 | 1 | 1 | 0 | 0 | 1 | 1 |
| 1012 | 1 | 1 | 1 | 1 | 1 | 1 | 0 | 1 | 0 | 0 |
| 1013 | 1 | 1 | 1 | 1 | 1 | 1 | 0 | 1 | 0 | 1 |
| 1014 | 1 | 1 | 1 | 1 | 1 | 1 | 0 | 1 | 1 | 0 |
| 1015 | 1 | 1 | 1 | 1 | 1 | 1 | 0 | 1 | 1 | 1 |
| 1016 | 1 | 1 | 1 | 1 | 1 | 1 | 1 | 0 | 0 | 0 |
| 1017 | 1 | 1 | 1 | 1 | 1 | 1 | 1 | 0 | 0 | 1 |
| 1018 | 1 | 1 | 1 | 1 | 1 | 1 | 1 | 0 | 1 | 0 |
| 1019 | 1 | 1 | 1 | 1 | 1 | 1 | 1 | 0 | 1 | 1 |
| 1020 | 1 | 1 | 1 | 1 | 1 | 1 | 1 | 1 | 0 | 0 |
| 1021 | 1 | 1 | 1 | 1 | 1 | 1 | 1 | 1 | 0 | 1 |
| 1022 | 1 | 1 | 1 | 1 | 1 | 1 | 1 | 1 | 1 | 0 |
| 1023 | 1 | 1 | 1 | 1 | 1 | 1 | 1 | 1 | 1 | 1 |

OPTICAL PATH SELECTION SYSTEM

BACKGROUND OF THE INVENTION

The present invention relates to an optical path opening and closing device or optical path selection system and more particularly an optical path selection system for use in a code-to-character conversion system.

In an information display or retrieval system, a device for converting the coded information into the characters has been proposed, but the device is complicated in construction and expensive to fabricate.

One of the objects of the present invention is to eliminate such defects as described above. Another object of the present invention is to provide an optical path selection system simple in construction and reliable in high-speed operation.

SUMMARY OF THE INVENTION

In brief, the present invention provides an optical path selection system for use in an information display or retrieval system wherein backwardly of a character plate having a suitable number of characters or the like arrayed in rows and columns are disposed a plurality of character selection plates each having a plurality of transparent and opaque frames which are arrayed in accordance with the binary codes representing said characters, the number of said character selection plates being the same with that of the bits constituting said codes; and said character selection plates are selectively displaced in either of the row or column direction by a distance corresponding to the width of said frame in response to an instruction given in the form of said codes, thereby opening the optical path only for a selected character in response to said instruction.

The character plate having the characters to be displayed is formed integrally with or independently of a microlens plate having a plurality of microlenses so that the selected character may be projected as an upright image. A plurality of character selection plates are disposed in the rear of the character plate. Each character selection plate has a plurality of transparent an opaque frames which are arrayed in accordance with a predetermined pattern. The selection plates are displaced in the vertical or horizontal direction according to the code which represents a character to be selected and displayed so that only the character which is positioned in opposed relation of all of the transparent frames of all of the selection plates overlapped so as to provide an optical path may be projected. The number of selection plates which are moved in the horizontal direction is generally equal to that of the selection plates which are moved in the vertical direction, but all of the selection plates may be so arranged as to be displaced only in one direction. The codes for causing such displacement of the selection plates are predetermined codes representing the characters upon the character plate. The number of selection plates is equal to that of the bits used in the code. The selection plates may be displaced securely by the electromagnets which are energized in response to the codes so that the mechanism for displacing the selection plates of the device of the present invention is extremely simple in construction and highly reliable in operation.

The above and other objects, features and advantages of the present invention will become more apparent from the following description of some illustrative embodiments thereof with reference to the accompanying drawing.

BRIEF DESCRIPTION OF THE DRAWING

FIG. 7 and FIG. 8 respectively illustrate one of the binary codes used in arraying the characters and the frames of the character selection plates used in the optical path selection systems illustrated in FIGS. 1 and 3; and FIG. 9 illustrates the binary codes applied to the character plate and the character selection plates used in the device of the present invention utilizing the microlenses illustrated in FIG. 4.

DESCRIPTION OF THE PREFERRED EMBODIMENTS

Figure 1:
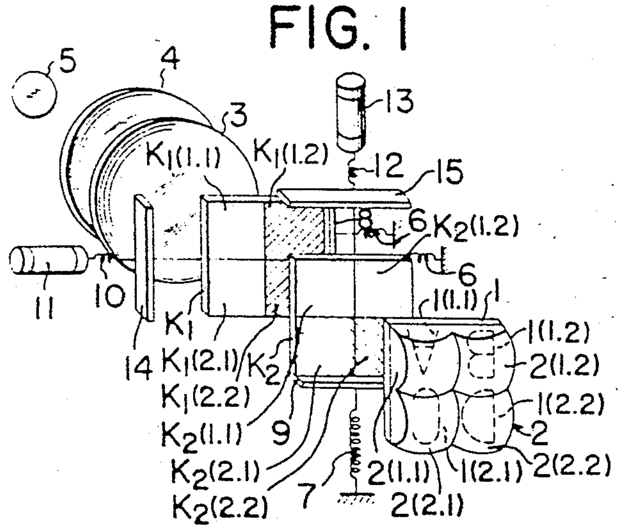
FIG. 1 is a perspective view of an optical path selection system of the present invention.

Referring to FIG. 1, a transparent character plate 1 having two rows and two columns includes character frames 1(1,1), 1(1,2), 1(2,1) and 1(2,2) securely pasted over the back surface of a lens plate 2 by use of a transparent adhesive agent. The lens plate 2 consists of microlenses 2(1,1), 2(1,2), 2(2,1) and 2(2,2). A pair of character selection plates $K_1$ and $K_2$ and further, a pair of condenser lenses 3 and 4 and a light source 5 in the order named are disposed in the rear of the character plate 1.

Opaque inverted characters A, B, C and D are marked in the character frames respectively so that they may be projected as upright images by the microlenses. These characters displayed are represented by the codes consisting of two bits based upon the 1-2-4-8 binary code shown in FIG. 7. The character selection plates have the frames $K_1(1,1)$, $K_1(1,2)$, $K_1(2,1)$, $K_1(2,2)$, $K_2(1,1)$, $K_2(1,2)$, $K_2(2,1)$ and $K_2(2,2)$ which correspond to the character frames respectively. In accordance with the code shown in FIG. 7, the frame corresponding to the code 0 is transparent while the frame corresponding to the code 1 is opaque. In the code shown in FIG. 7, the column of the weight 1 corresponds to the character selection plate $K_1$ whereas the column of the weight 2, to the character selection plate $K_2$ so that the frames $K_1$ (1,1) and $K_2(1,1)$ corresponding to the character A is transparent (the transparent frames are shown with no hatching while the opaque frames are hatched by lines extending upwardly from left to right); among the frames corresponding to the character B, the frame $K_2(1,2)$ is opaque while the frame $K_2(1,2)$, transparent; among the frames for the character C, the frame $K_1(2,1)$ is transparent while the frame $K_2(2,1)$, opaque (the opaque frames in the character selection plate $K_2$ is shown by the hatching lines running upwardly from right to left); and the frames $K_1(2,2)$ and $K_2(2,2)$ are both opaque. The plate $K_1$ is biased toward the right by a spring 6 while the plate $K_2$ is biased downwardly by a spring 7, and these plates $K_1$ and $K_2$ are stopped by stoppers 8 and 9 respectively to the positions corresponding to the plate 1. Furthermore, the plate $K_1$ is coupled to an electromagnet 11 through a spring 10 while the plate $K_2$ is coupled to an electromagnet 13 through a spring 12. Upon energization of these electromagnets 11 and 13, the plate $K_1$ is displaced to left against the spring 6 while the plate $K_2$ is displaced upwardly against the spring 7. In this case, these plates $K_1$ and $K_2$ are displaced by a distance corresponding to one width of the frame by means of stoppers 14 and 15 respectively.

The electromagnets 11 and 13 are adapted to be energized by the instruction of the above-described codes. For example, when an instruction consisting of the code (0,0) for selecting the character A is given, the electromagnets are not energized at all. When the code (0,1) for selecting B is given, only the electromagnet 11 is energized.

Figures 2A, 2B, 2C, 2D:
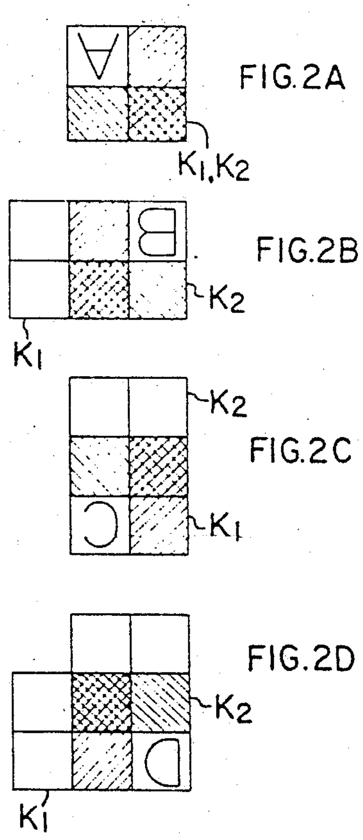
FIGS. 2A, 2B, 2C and 2D are for explanation of the relative positions of the character selection plates with respect to the character plate.

The relative positions of the plates $K_1$ and $K_2$ with respect to the plate 1 by the electromagnets which are energized by the instruction will be described with reference to FIG. 2. When the instruction is (0,0) for selecting A, neither of the plates $K_1$ and $K_2$ are displaced so that the character A is selected as shown in FIG. 2A. In this case, the light from the light source 5 reaches the character frame 1(1,1), passes therethrough and is converged by the microlens 2(1,1) so that the character A is projected as an upright image (see FIG. 1). When the instruction is (0,1) for selecting B, only the plate $K_1$ is displaced to left as shown in FIG. 2B. Only the plate $K_2$ is displaced upwardly for the instruction (1,0) for selecting the character C as shown in FIG. 2C. For the instruction (1,1) for selecting the character D, both of the plates $K_1$ and $K_2$ are displaced as shown in FIG. 2D.

In the embodiment described above, the number of characters are limited only to four for the convenience of description, but it will be understood that a large number of characters may be selected in accordance with instruction in practice. That is, according to the 1-2-4-8 binary code, when the number of the character selection plates is $n$, then the number of $2^n$ characters may be coded. Therefore, the number of $n$ character selection plates may be displaced in accordance to the instructions given in the form of the above-described code so that the number of $2^n$ characters may be selected.

Figure 5:
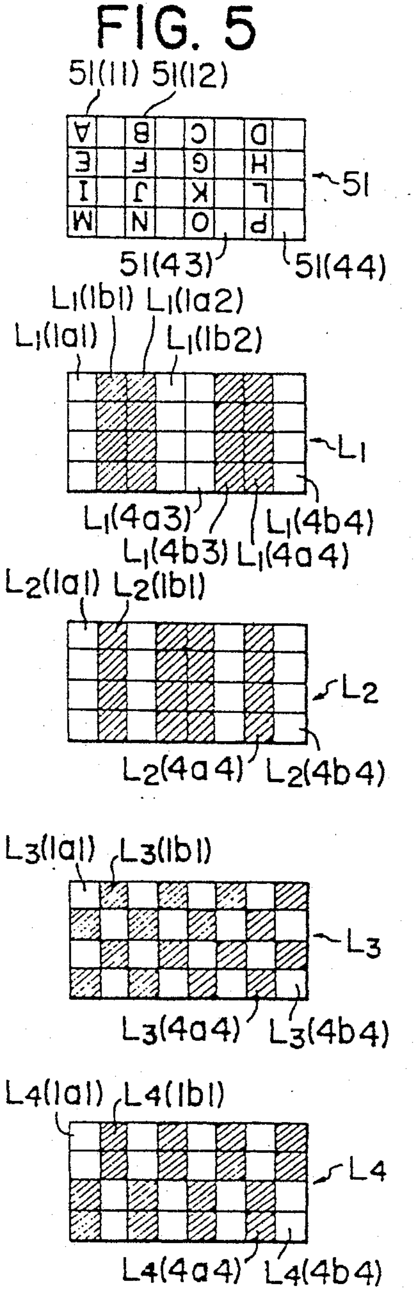
FIG. 5 are front views of the character plate and the character selection plates used in the embodiment illustrated in FIG. 3.

FIG. 5 illustrates another embodiment of the present invention in which the code illustrated in FIG. 8 and four character selection plates $L_1$, $L_2$, $L_3$ and $L_4$ are used in order to select 16 ($=2^4$) characters from A to P which are marked upon a character plate 51. One example of the combinations of these plates 51 and $L_1$ to $L_4$ and the optical system is illustrated in FIG. 3.

The character plate 51 is divided into character frames 51(1,1), 51(1,2),...,51(4,3) and 51(4,4) which are the same in size and arrayed in four columns and four rows. Each character frame is further divided into two subframes equal in size in the direction of the row. Opaque inverted characters from A to P which are coded by four-bits codes shown in FIG. 8 are placed in the left subframes of the character frames as best shown in FIG. 5 so that they may be projected as upright images by the microlenses. The selection plates $L_1$ to $L_4$ are provided with the frames corresponding to the subframes of the character plate 51 respectively. These frames are $L_1$(1*a*, 139 1)$L_1$(1*b*,1), $L_1$(1*a*,2), $L_1$(1*b*,2),...$L_1$(4*b*,3),$L_1$(4*a*,4),$L_1$(4*b* ,4)$L_2$(1*a*,1), $L_2$(1 *b*,1),...$L_2$(4*a*,4),$L_2$(4*b*,4);$L_3$(1*a*,1)...$L_3$(4 *b*,4); and $L_4$(1*a*,1),...$L_4$(4*b*,4). The column of the weight 1 in the code illustrated in FIG. 8 corresponds to the plate $L_1$; the column of the weight 2, to the plate $L_2$; the column of the weight 4, to the plate $L_3$; and the column of the weight 8, to the plate $L_4$ respectively. Among the frames of the plate $L_1$, the frame $L_1$(1*a*,1) corresponding to the character A is transparent; the frame $L_1$(1*a*,2) for B is opaque and so on. The frame $L_1$(1*b*,1) at the right of the transparent frame $L_1$(1*a*,2) is opaque with respect to the transparent frame $L_1$(1*a*,1); the frame $L_1$(1*b*,2) at the right of the opaque frame $L_1$(1*a*,2) is transparent and so on. As shown in FIG. 5, each of the frames of the plates $L_1$ to $L_4$ consists of a pair of transparent and opaque subframes in accordance with the codes shown in FIG. 8. In this embodiment, each of the characters is placed in the left subframes, each of the frames of the character selection plates consists of a pair of subframes and the subframe at the right of the subframe of each of the frames of the selection plates is transparent when the right subframe which corresponds to the subframe carrying the character is opaque and vice versa. These arrangements serve to prevent the case in which a designated character is not selected even when the character selection plates are displaced, accordingly since the same codes appear in succession so that the same frames appear in succession in one plate, as the characters to be selected and the number of character selection plates are increased, or the case in which two characters are simultaneously selected by a single code.

Figure 3:
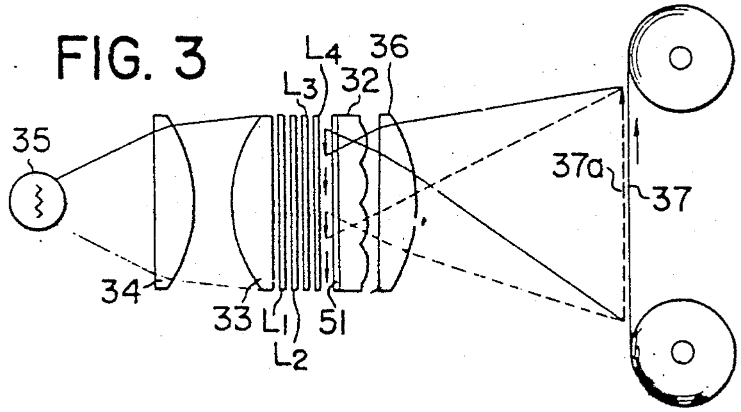
FIG. 3 is a schematic side view illustrating another embodiment of the present invention.

In FIG. 3, the character plate 51 is securely fixed upon the back surface of a microlens plate 32 consisting of microlenses arrayed in four columns and four rows. The character selection plates $L_1$ to $L_4$ are disposed in the rear of the character plate 51, and a pair of condenser lenses 33 and 34 and a light source 35 are disposed in the rear of the selection plate $L_4$. An optical path correction lens 36 is disposed in the rear of the lens plate 32 and an electrophotographic sensitized paper 37 is placed in the image-focusing plane of the lens 36 so that the character selected by the character selection plates may be focused as an image 37*a* upon the sensitized paper 37. Thus, according to this embodiment, the coded information may be recorded upon the sensitized paper 37 moving in the direction indicated by the arrow as a character image.

The selection plates $L_1$ to $L_4$ are so arranged as to move to the left in FIG. 5 by a distance corresponding to the width of one frame in accordance with the instruction in the form of codes illustrated in FIG. 8. For example, when an instruction is (0,1,1,0) for selecting the character G, the selection plates $L_1$ and $L_4$ remain unchanged while the plates $L_2$ and $L_3$ are displaced so that the optical path for illuminating and projecting the character G is selected or opened.

Figure 4:
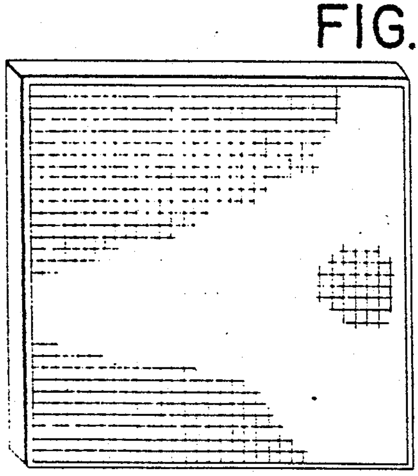
FIG. 4 is a perspective view illustrating one embodiment of a microlens plate used in the present invention.
Figure 6:
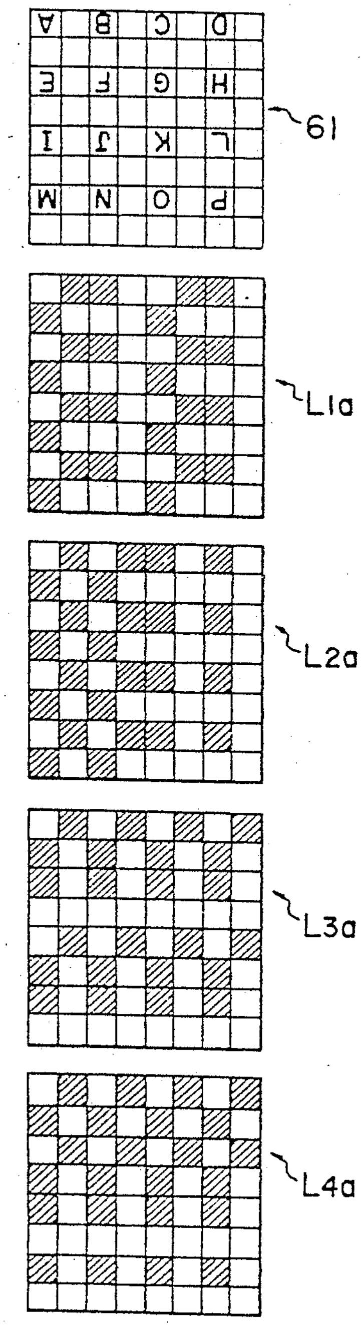
FIG. 6 are front views of the character plate and the character selection plates which are also used in the present invention.

FIG. 6 illustrates a character plate 61 and character selection plates $L_{1a}$, $L_{2a}$, $L_{3a}$ and $L_{4a}$ similar to those in FIG. 5. But these plates illustrated in FIG. 6 may be displaced or moved to the left and upwardly. Each of the frames 61(1,1) to 61(4,4) of the character plate 61 is divided into four subframes equal in size and the characters A to P are placed in the top left subframes of the character frames respectively. Each of the frames of the plates $L_{1a}$ to $L_{4a}$ is divided also into four subframes corresponding to the four subframes of the character plate. Each subframe corresponding to the subframe carrying the character is made transparent or opaque in accordance with the codes illustrated in FIG. 8 as in the case of the embodiment described with reference to FIG. 5, and the right and lower subframes are made opaque or transparent. In the similar manner as described above, the conversion of the codes into the corresponding characters can be effected by use of the character plate 61 and the character selection plates $L_{1a}$ to $L_{4a}$, and the selection plates may be displaced upwardly or to left with respect to the character plate 61 so as to select a desired character by one instruction. FIG. 9 illustrates the 1-2-4-8 codes, each code consisting of 10 bits in order to select one of the number of $2^{10}$(=1,024) characters by use of 10 character selection plates $M_1$ to $M_{10}$. In this case, the microlenses are arrayed in 32 columns and 32 rows and the frames of each character selection plate are arrayed in 64 rows and 32 columns or 32 rows and 64 columns when the plate is displaced in one direction only while they are arrayed in 64 rows and 64 columns when displaced in two directions. FIG. 4 illustrates a microlens plate used in this embodiment and the width of one microlens is of the order of 1 to 5 mm.

The direction of movement of the character selection plate may be arbitrarily selected and the subframes into which are marked the characters are selected accordingly. Any character may be selected and represented by a suitable binary code and the coded information may be converted into the character according to the present invention. Thus, a suitable code conversion device is required when the information coded by the code utilized in the electronic computer is displayed by the device of the present invention, but it will be understood that the code used in the present invention may be any code generally used. In this case, when the number of bits is not sufficient, a few character plates may be disposed in such a manner that one of them may be suitably replaced for display by the instruction. In this case, it is not required to securely fix the character plate upon the microlens plate but the plate may be disposed in the rear of the lens plate. It will be understood that when the characters are directly printed upon the back surface of the lens plate, a plurality of such microlens plates may be so arranged as to be suitably replaced in response to an instruction.

The device of the present invention is not only applied to the information display device of the character described above but also the information retrieval system in which instead of the above-described character plate, microfilms or microcards are used.

The character plate may not be transparent and in this case, the characters or the like are transparent. The device for displacing or moving the character selection plates is not limited to the device described with reference to the accompanying drawing, but any other suitable device may be used. Furthermore, the optical system including the lenses, the light source and means for receiving the projected image may be suitably selected. As means for receiving the projected image, the image-recording medium such as photographic film and the video transmitter-receiver may be used instead of the electrophotographically sensitized paper illustrated in FIG. 3.

The device of the present invention which is of general control system requires no interlocking mechanism and is simple in construction. A plurality of character selection plates, however, may be actuated simultaneously with a relatively small displacement and the optical path opening and closing operation may be effected securely at high speed. Furthermore, according to the present invention, the number of characters to be selected may be increased remarkably. It will be readily seen that the device of the present invention offers great advantages in the field of data processing.

I claim:

1. An optical path system for use in a code-to-character conversion arrangement comprising a lens plate having a front and back side including a plurality of microlenses arrayed in rows and columns;

a selected character plate having an array of character frame means mounted on the back side of said lens plate, said character frame means having individual characters marked thereon;

a plurality of alignable character selection plates spaced from and facing the back side of said lens plate, the number of characters that can be coded being $2^n$ where $n$ is the number of character selection plates;

said character selection plates arrayed in accordance with binary codes each representing each of said characters, the number of said character selection plates being equal to that of bits of said code;

each said character selection plate having frame means corresponding in size to said character plate frame means and having a group of at least two subframes, one subframe being transparent and one subframe being opaque;

means to individually and selectively displace each character selection plate by a distance corresponding to the width of one subframe; and the alignment of said character selection plates being varied by said displacement to provide an optical path through aligned transparent subframes for a selected character.

2. A system according to claim 1 in which a plurality of lens plates are provided, different groups of characters are printed thereon, and said plates are individually selected for incorporation into the system.

3. A system according to claim 1 in which said displacement means comprises electromagnets positioned respectively on one side of each character selection plate and energizable in response to code instruction, and stopper means are provided to limit the movement of each said plate.

4. A system according to claim 1 in which said character frames include groupings comprising two subframes each, each subframe being equal and corresponding in size to the subframes of said character selection plate, 16 characters are provided, one each located in one of said character frame subframe groupings, and four character selection plates are provided for the desired alignment.

5. A system according to claim 4 in which the displacement of each said character selection plate is solely reciprocatory in a direction transversely of said lens plate.

6. A system according to claim 1 in which each grouping in said character selection plate includes four subframes, each character plate has a plurality of groups comprising four subframes each with one character located in each one of said groups, and the subframes of said character plate being equal and corresponding in size to the subframes of said character selection plate.

7. A system according to claim 6 in which the displacement of each said character plate is both vertical and horizontal with respect to said lens plate.

* * * * *